United States Patent
Campbell et al.

(10) Patent No.: US 10,299,238 B2
(45) Date of Patent: *May 21, 2019

(54) METHOD AND APPARATUS FOR MANAGING MOBILE SUBSCRIBER IDENTIFICATION INFORMATION ACCORDING TO REGISTRATION REQUESTS

(71) Applicants: AT&T Mobility II LLC, Atlanta, GA (US); AT&T Intellectual Property I, L.P., Atlanta, GA (US)

(72) Inventors: Clifton Ashman Campbell, Norcross, GA (US); Stephen Emille Chin, Marietta, GA (US); Walter Cooper Chastain, Atlanta, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/796,926

(22) Filed: Oct. 30, 2017

(65) Prior Publication Data

US 2018/0084516 A1 Mar. 22, 2018

Related U.S. Application Data

(63) Continuation of application No. 15/237,098, filed on Aug. 15, 2016, now Pat. No. 9,838,991.

(51) Int. Cl.
*H04W 8/18* (2009.01)
*H04W 60/00* (2009.01)
(Continued)

(52) U.S. Cl.
CPC ............. *H04W 60/00* (2013.01); *H04W 8/04* (2013.01); *H04W 8/06* (2013.01)

(58) Field of Classification Search
CPC ..... H04W 8/205; H04W 8/245; H04W 12/04; H04W 36/0072; H04W 28/085;
(Continued)

(56) References Cited

U.S. PATENT DOCUMENTS

| 5,598,459 A | 1/1997 | Haartsen et al. |
| 5,765,105 A | 6/1998 | Kuriki |

(Continued)

FOREIGN PATENT DOCUMENTS

| AU | 2014227509 A1 | 10/2014 |
| CA | 2673830 A1 | 7/2008 |

(Continued)

OTHER PUBLICATIONS

Choudhruy, Hiten, "A New Trust Model for Improved Identity Privacy in Cellular Networks", http://citeseerx.ist.psu.edu/viewdoc/download?doi=10.1.1.247.2671&rep=rep1&type=pdf, Disclosing re-using identifications for subsequent connections (p. 3)., 2012,.

(Continued)

*Primary Examiner* — Phuoc H Doan
(74) *Attorney, Agent, or Firm* — Guntin & Gust, PLC; Douglas Schnabel

(57) ABSTRACT

Aspects of the subject disclosure may include, for example, a system that manages utilization of mobile subscriber identity information including enabling reuse of such information by a different communication device and/or re-authorizing use by a communication device that previously was authorized to utilize the information. Other embodiments are disclosed.

20 Claims, 9 Drawing Sheets

(51) Int. Cl.
*H04W 8/04* (2009.01)
*H04W 8/06* (2009.01)

(58) Field of Classification Search
CPC .... H04W 72/10; H04W 36/36; G06Q 20/385;
G06Q 20/40; G06Q 20/3821; G06Q
20/325; H04M 3/2281; H04M 3/2218;
H04M 3/42221
USPC ......... 455/437, 433, 436, 440; 370/235, 312
See application file for complete search history.

(56) References Cited

U.S. PATENT DOCUMENTS

| | | | |
|---|---|---|---|
| 5,887,257 | A | 3/1999 | Olds et al. |
| 6,154,654 | A | 11/2000 | Mao |
| 6,591,098 | B1 | 7/2003 | Shieh et al. |
| 7,266,371 | B1 | 9/2007 | Amin et al. |
| 7,840,234 | B2 | 11/2010 | Chan et al. |
| 8,050,274 | B2 | 11/2011 | Ala-Luukko et al. |
| 8,145,212 | B2 | 3/2012 | Lopresti et al. |
| 8,406,758 | B2 | 3/2013 | Snijder et al. |
| 8,463,258 | B2 | 6/2013 | Parsons et al. |
| 8,468,260 | B2 | 6/2013 | Yu |
| 8,505,081 | B2 | 8/2013 | Hawkes et al. |
| 8,509,767 | B2 | 8/2013 | Cochran et al. |
| 8,515,488 | B2 | 8/2013 | Hillier et al. |
| 8,700,000 | B2 | 4/2014 | Pauliac et al. |
| 8,718,711 | B2 | 5/2014 | Shi et al. |
| 9,028,577 | B2 | 5/2015 | Muratore et al. |
| 9,491,563 | B1 | 11/2016 | Hatton et al. |
| 9,615,250 | B2 | 4/2017 | Guday et al. |
| 9,699,646 | B2 | 7/2017 | Poon et al. |
| 9,794,905 | B1 | 10/2017 | Chastain et al. |
| 2002/0197991 | A1 | 12/2002 | Anvekar et al. |
| 2003/0236980 | A1 | 12/2003 | Hsu et al. |
| 2005/0075106 | A1 | 4/2005 | Jiang |
| 2006/0035631 | A1 | 2/2006 | White et al. |
| 2007/0133467 | A1 | 6/2007 | Hsu et al. |
| 2008/0026740 | A1 | 1/2008 | Netanel et al. |
| 2008/0153521 | A1 | 6/2008 | Benaouda et al. |
| 2008/0268842 | A1 | 10/2008 | Herrero-Veron et al. |
| 2008/0293377 | A1 | 11/2008 | Pauliac et al. |
| 2009/0029684 | A1 | 1/2009 | Rosenblatt et al. |
| 2009/0149175 | A1 | 6/2009 | Lopresti et al. |
| 2009/0264122 | A1 | 10/2009 | Van Loon et al. |
| 2010/0009659 | A1 | 1/2010 | Netanel et al. |
| 2010/0093358 | A1 | 4/2010 | Cheong et al. |
| 2010/0136967 | A1 | 6/2010 | Du et al. |
| 2010/0159924 | A1 | 6/2010 | Lagerman et al. |
| 2010/0190473 | A1 | 7/2010 | Ishikawa et al. |
| 2010/0273462 | A1 | 10/2010 | Thorn et al. |
| 2011/0007726 | A1 | 1/2011 | Xie et al. |
| 2011/0053619 | A1 | 3/2011 | Shaheen et al. |
| 2011/0171953 | A1 | 7/2011 | Faccin et al. |
| 2011/0191835 | A1 | 8/2011 | Hawkes et al. |
| 2012/0039312 | A1 | 2/2012 | Narkar et al. |
| 2012/0094634 | A1 | 4/2012 | Parsons et al. |
| 2012/0196570 | A1 | 8/2012 | Lindholm et al. |
| 2012/0282891 | A1 | 11/2012 | Mohammed et al. |
| 2012/0282924 | A1 | 11/2012 | Tagg et al. |
| 2012/0303961 | A1 | 11/2012 | Kean et al. |
| 2012/0309374 | A1 | 12/2012 | Tagg et al. |
| 2012/0322410 | A1 | 12/2012 | Lodeweyckx et al. |
| 2013/0012159 | A1 | 1/2013 | Lodeweyckx et al. |
| 2013/0012168 | A1 | 1/2013 | Rajadurai et al. |
| 2013/0029637 | A1 | 1/2013 | Hillier et al. |
| 2013/0065583 | A1 | 3/2013 | Pan |
| 2013/0095795 | A1 | 4/2013 | Shi |
| 2013/0102306 | A1 | 4/2013 | Sachanandani |
| 2013/0157673 | A1 | 6/2013 | Brusilovsky et al. |
| 2013/0165075 | A1 | 6/2013 | Rishy-Maharaj et al. |
| 2013/0219180 | A1 | 8/2013 | Saino et al. |
| 2013/0326603 | A1 | 12/2013 | Kato et al. |
| 2013/0343256 | A1* | 12/2013 | Zakrzewski ............ H04W 8/26 370/312 |
| 2014/0004827 | A1 | 1/2014 | O'Leary et al. |
| 2014/0051422 | A1 | 2/2014 | Mittal et al. |
| 2014/0075532 | A1 | 3/2014 | Murakami et al. |
| 2014/0094144 | A1 | 4/2014 | Thorn et al. |
| 2015/0148032 | A1 | 5/2015 | Rainer et al. |
| 2015/0230087 | A1 | 8/2015 | Barkan |
| 2015/0237496 | A1 | 8/2015 | Gao et al. |
| 2015/0311934 | A1 | 10/2015 | Jang et al. |
| 2015/0341852 | A1 | 11/2015 | Knudsen |
| 2015/0350091 | A1* | 12/2015 | Solovyev .............. H04W 88/12 370/235 |
| 2015/0359026 | A1 | 12/2015 | Iwai et al. |
| 2016/0019381 | A1 | 1/2016 | Yang et al. |
| 2016/0174069 | A1 | 6/2016 | Bruner et al. |
| 2016/0183081 | A1 | 6/2016 | Flores et al. |
| 2016/0183086 | A1 | 6/2016 | Sharaga et al. |
| 2016/0205546 | A1 | 7/2016 | Poon et al. |
| 2016/0295544 | A1 | 10/2016 | Jiang et al. |
| 2016/0350097 | A1 | 12/2016 | Mahapatra et al. |
| 2017/0026823 | A1 | 1/2017 | Mohammed et al. |
| 2017/0064539 | A1 | 3/2017 | Yang |
| 2017/0135059 | A1 | 5/2017 | Taneja et al. |
| 2017/0230820 | A1 | 8/2017 | Ho et al. |
| 2017/0374543 | A1 | 12/2017 | Lee |
| 2018/0049018 | A1 | 2/2018 | Campbell et al. |
| 2018/0063688 | A1 | 3/2018 | Lindholm et al. |
| 2018/0077561 | A1 | 3/2018 | Chastain et al. |
| 2018/0077563 | A1 | 3/2018 | Chastain et al. |
| 2018/0077666 | A1 | 3/2018 | Chastain et al. |
| 2018/0077667 | A1 | 3/2018 | Walter |
| 2018/0077669 | A1 | 3/2018 | Chastain et al. |
| 2018/0139602 | A1 | 5/2018 | Chastain et al. |
| 2018/0152831 | A1 | 5/2018 | Chastain et al. |
| 2018/0160288 | A1 | 6/2018 | Chastain et al. |
| 2018/0160292 | A1 | 6/2018 | Chastain et al. |
| 2018/0160296 | A1 | 6/2018 | Chastain et al. |
| 2018/0160385 | A1 | 6/2018 | Chastain et al. |
| 2018/0184282 | A1 | 6/2018 | Chastain et al. |
| 2018/0227742 | A1 | 8/2018 | Campbell et al. |

FOREIGN PATENT DOCUMENTS

| | | |
|---|---|---|
| CN | 101868991 A | 10/2010 |
| CN | 103167465 A | 6/2013 |
| DE | 60224063 T2 | 11/2008 |
| EP | 2814271 A1 | 12/2014 |
| GB | 2473753 B | 3/2013 |
| JP | 2013505658 A | 2/2013 |
| WO | 2004075598 A1 | 9/2004 |
| WO | 2013008048 A1 | 1/2013 |

OTHER PUBLICATIONS

Elouafiq, Ali, "Authentication and Encryption in GSM and 3G/UMTS an Emphasis on Protocols and Algorithms", http://arxiv.org/pdf/1204.1651, 2012.

Han, Chan-Kyu, "Evaluation of Authentication Signaling Loads in 3GPP LTE/SAE Networks", https://www.researchgate.net/profile/Jung_Woo_Baek/publication/221081030_Evaluation_of_authentication_signaling_loads_in_3GPP_LTESAE_networks/links/0046352597bfe186e0000000.pdf, 2009.

Jehadessan, R, "Mobile Communication Technologies", http://www.academia.edu/download/3455626/Information_and_Knowledge_Management_Using_GNOWSYS.pdf#page=111, 2005.

Kesdogan, Dogan, "Location Management Strategies Increasing Privacy in Mobile Communication", http://epub.uni-regensburg.de/7414/1/KFJP_96IFIPSec.pdf, 1996.

Thigale, Somnath, "Applying New Trust Requirements in 3GPP Mobile Systems for Improved Subscriber Identity Privacy", http://www.academia.edu/download/37998673/ijsrp-p4250.pdf, 2015.

* cited by examiner

200

METHOD AND APPARATUS FOR MANAGING MOBILE SUBSCRIBER IDENTIFICATION INFORMATION ACCORDING TO REGISTRATION REQUESTS

FIELD OF THE DISCLOSURE

This application is a Continuation of and claims priority to U.S. patent application Ser. No. 15/237,098 filed on Aug. 15, 2016. The contents of the foregoing is hereby incorporated by reference into this application as if set for herein in full.

FIELD OF THE DISCLOSURE

The subject disclosure relates to a method and apparatus for managing mobile subscriber identification information according to registration requests.

BACKGROUND

Mobile communication devices register with networks so that the devices can provide communication services to subscribers. The registration process requires exchanging messages between the mobile communication device and network device(s), as well as exchanging messages between network devices.

As an example as illustrated in FIG. 1, a device can provide mobile subscriber identification information to the network at 101 which is received by a registration function (e.g., a Home Location Register (HLR)). Various information can be exchanged on the network-side and an analysis of the mobile subscriber identification information can be performed resulting in a registration authorization being provided to the device at 102.

BRIEF DESCRIPTION OF THE DRAWINGS

Reference will now be made to the accompanying drawings, which are not necessarily drawn to scale, and wherein.

DETAILED DESCRIPTION

Figure 1:
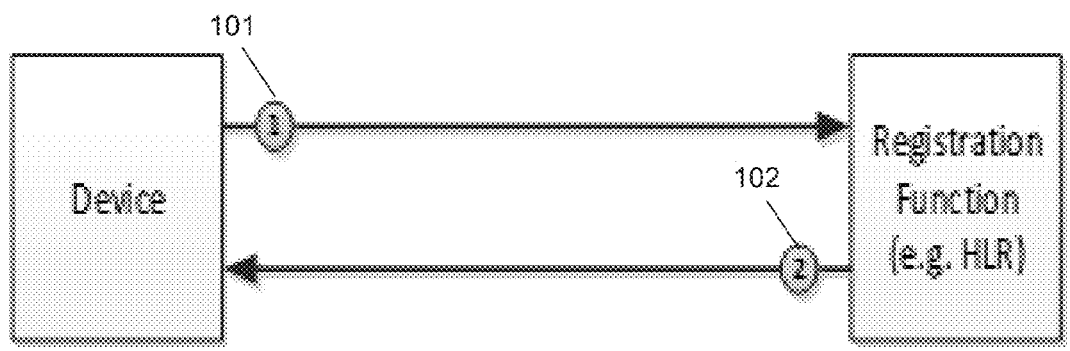
FIG. 1 depicts an illustrative embodiment of a registration process in the prior art.

The subject disclosure describes, among other things, illustrative embodiments for managing utilization of mobile subscriber identity information referred to herein as an International Mobile Subscriber Identity (IMSI). The system and methods described herein can enable reuse of an IMSI by a different communication device and/or re-authorizing use by a communication device that previously was authorized to utilize the IMSI. In one or more embodiments, the communication devices can be end user devices, or other devices including Machine-to-Machine (M2M) or Internet of Things (IoT) devices. Other embodiments are described in the subject disclosure.

One or more aspects of the subject disclosure is a method that includes receiving, by an identity proxy function executed by a processing system including a processor, a registration request associated with a communication device where the registration request includes an international mobile subscriber identity of the communication device. The method can include accessing, by the identity proxy function, information that identifies a group of international mobile subscriber identities and that indicates a subset of the group of international mobile subscriber identities that have been reassigned to other communication devices. Responsive to a first determination that the international mobile subscriber identity is not included in the group of international mobile subscriber identities or a second determination that the international mobile subscriber identity is included in the subset of the group of international mobile subscriber identities, providing, by the identity proxy function, the registration request to a registration function for completing a registration process for the communication device that enables communication services at the communication device.

One or more aspects of the subject disclosure can include a device having a processing system including a processor and a memory that stores executable instructions that, when executed by the processing system, facilitate performance of operations. The operations can include receiving an international mobile subscriber identity of a communication device. The operations can include accessing information that identifies a group of international mobile subscriber identities and that indicates a subset of the group of international mobile subscriber identities that have been reassigned to other communication devices. Responsive to a first determination that the international mobile subscriber identity is included in the subset of the group of international mobile subscriber identities and that the communication device is not one of the other communication devices that has received a reassignment of one of the subset of the group of international mobile subscriber identities, the operations can include providing (e.g., via an identity provisioning function) the communication device with provisioning information that disables use of the international mobile subscriber identity by the communication device.

One or more aspects of the subject disclosure includes a machine-readable storage medium, comprising executable instructions that, when executed by a processing system of a communication device that includes a processor, facilitate performance of operations. The operations include providing a registration request that is received by an identity proxy function operating in a server, where the registration request includes a first international mobile subscriber identity of the communication device. The operations can include, responsive to a determination that the first international mobile subscriber identity has been reassigned to another communication device and that the communication device is not the other communication device, receiving, (e.g., from an identity provisioning function), provisioning information that includes a second international mobile subscriber identity. The operations can include facilitating a registration process that utilizes the second international mobile subscriber identity and that enables communication services at the communication device.

Figure 2:
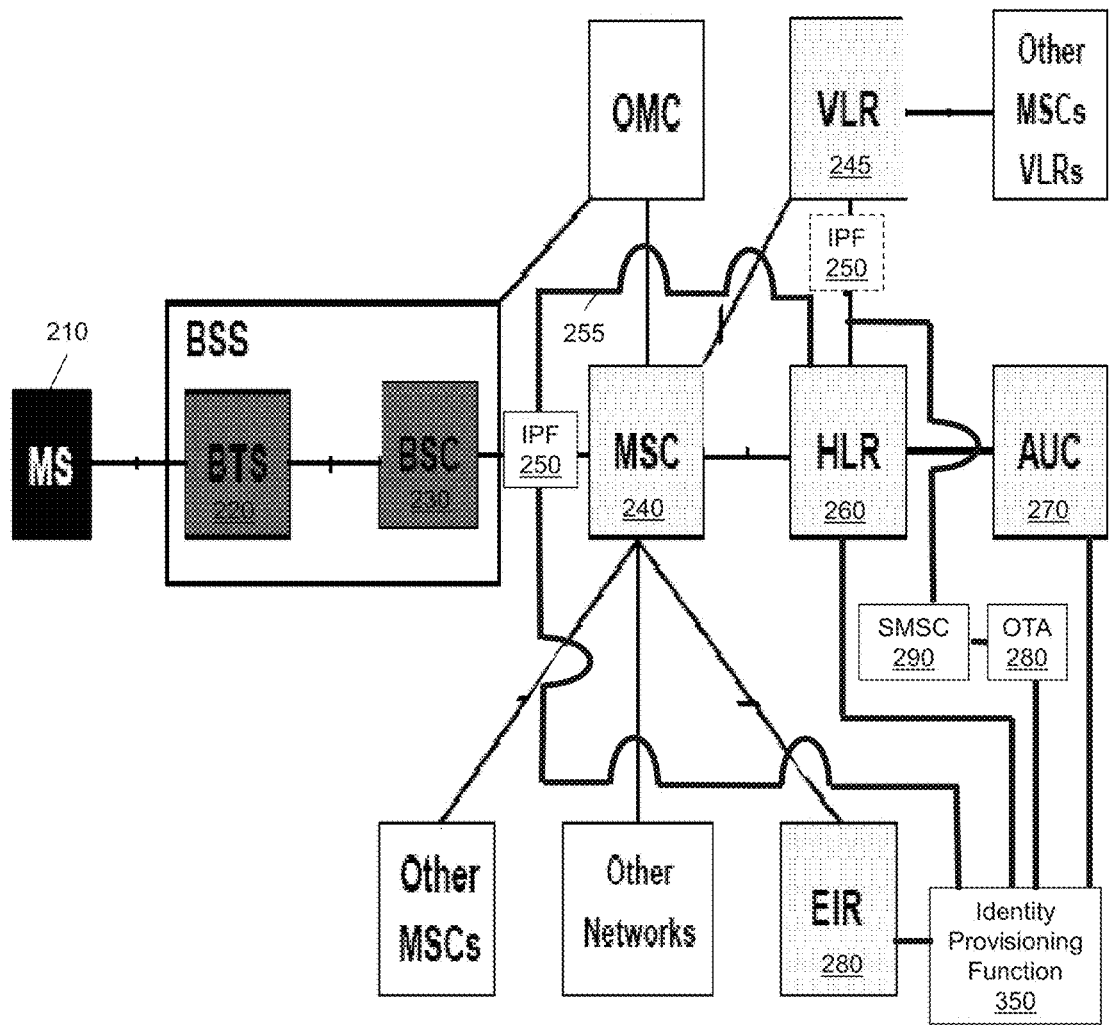
FIG. 2 depicts an illustrative embodiment of a system that provides communication services and enables re-using mobile Subscriber Identification Information by other devices.

FIG. 2 depicts an illustrative embodiment of a communication system 200 (e.g., a Global System for Mobile Communications (GSM) system) that provides communication services such as to a communication device 210. The communication device 210 can be various types of devices such as a mobile phone or other devices that utilize an IMSI for establishing communication services. The types of communication services can vary including voice services, video, data and/or messaging. System 200 enables IMSI re-use by the same or other communication devices through use of an identity proxy function 250 and an identity provisioning function 350.

System 200 can include various components that facilitate providing the communication services, such as a Base Station Subsystem (BSS) that performs various functions (e.g., allocation of radio channels, paging, transmitting and receiving over the air interface). The BSS can include a Base Transceiver Station (BTS) 220 which can include equipment for transmitting and receiving radio signals, antennas, and equipment for encrypting and decrypting communications with a Base Station Controller (BSC) 230. The BSC 230 can serve several different frequencies and different sectors of a cell. System 200 can include a core network with other components such as a Mobile Switching Center (MSC) 240, a Visitor Location Register (VLR) 245, a Home Location Register (HLR) 260, an Authentication Center (AUC) 270, and an Equipment Identity Register (EIR) 270.

The MSC 240 can be a primary service delivery node that is responsible for routing voice calls and SMS, as well as other services, such as conference calls, FAX and circuit switched data. The VLR 245 can be a database of subscribers that have roamed into a jurisdiction of a particular MSC served by that VLR. The VLR 245 is illustrated as a stand-alone device but can be integrated with the MSC 240. The HLR 260 can be a central database that contains details of each mobile phone subscriber that is authorized to use the core network. In one or more embodiments, the HLRs can store details of Universal Integrated Circuit Cards (UICCs) (e.g., Subscriber Identity Module (SIM) cards) issued by the mobile phone operator. In one or more embodiments, IMSIs can be unique identifiers which are the primary key to each HLR record. In one or more embodiments, MSISDNs, which are the telephone numbers used by mobile phones to make and receive calls, can also be a primary key to a particular HLR record. Other data can be stored in the HLR 260 (e.g., indexed to a particular IMSI), such as communication services that the subscriber has requested or is authorized to utilize, GPRS settings to allow the subscriber to access packet services, a current location of subscriber call divert settings applicable for each associated MSISDN, and so forth.

The AUC 270 can perform a function to authenticate each UICC that attempts to connect to the core network (e.g., when the phone is powered on). Once the authentication is successful, the HLR 260 can manage the UICC and authorized communication services. The HLR 260 can maintain a list of mobile phones (e.g., identified by their International Mobile Station Equipment Identity (IMEI)) which are to be monitored or are to he prohibited from utilizing the network.

The EIR 280 can be a database that contains information about the identity of the mobile equipment that prevents calls from stolen, unauthorized or defective mobile stations. In one or more embodiments, the EIR 280 can log handset attempts that are stored in a log file. The EIR 280 is illustrated as a stand-alone device but can be integrated with the HLR 260. System 200 can include other features such as an Operations and Maintenance Center (OMC) that enables or otherwise facilitates the operation, administration and maintenance of a GSM network.

The communication system 200 can provide Over-The-Air (OTA) technology to communicate with, download applications to, and manage a UICC without being connected physically to the UICC. As an example, an OTA gateway 280 can communicate with a Short Message Service Center (SMSC) 290 for delivering provisioning information to the communication device 210, as well as propagating information to other network elements. For instance, OTA gateway 280 can transform information (e.g., service requests, provisioning information, and so forth) into short messages which are provided to the SMSC 290 for delivery to the communication device 210. In one embodiment, the OTA gateway 280 receives service requests through a gateway API that indicates the actual UICC to modify, update, and/or activate. In one embodiment, the OTA gateway 280 can have a UICC database that indicates for each UICC, the vendor, a UICC identification number, the IMSI and the MSISDN. In one embodiment, the service request can be formatted by the OTA gateway 280 into a message that can he understood by the recipient UICC, such as through use of libraries accessible to (or stored by) the OTA gateway that contain the formats to use for each brand of UICC. The resulting formatted message can then be sent to the SMSC 290 for delivery.

The identity proxy function 250 can be a stand-alone device (e.g., positioned between the BSS and the MSC 240), or can be integrated with other components of the system 200 such as being executed by a server that also executes the MSC/VLR functions. In one or more embodiments, the identity proxy function 250 is configured so that information (e.g., a registration request) being sent to a registration function (e.g., the HLR 260) is intercepted or otherwise first received by the identity proxy function prior to being received by the MSC 240, the VLR 245 and the HLR 260. The particular positioning of the identity proxy function 250 with respect to other network elements can vary provided that the identity proxy function maintains its ability to manage use and re-use of IMSIs. In one embodiment, a single identity proxy function 250 can be utilized for a set of MSC/VLR and HLR.

In another embodiment, multiple identity proxy functions 250 can be utilized for each set of MSC/VLR and HLR, where the identity proxy functions are positioned at various points in the core network such as between the BSS and the MSC 240 and between the VLR 245 and the HLR 260 (shown as dashed lines in FIG. 2). In one embodiment where multiple identity proxy functions 250 are utilized, they can communicate with each other for implementing the management of the use and re-use of the IMSIs.

In one embodiment, an interface 255 can be established between the identity proxy function 250 and other network components, such as the HLR 260. For example, the interface 255 can enable the identity proxy function 250 to communicate directly with the HLR 260 so as to bypass communication with the VLR. For instance and as described herein, the identity proxy function 250 can simulate function(s) of the VLR 245 such as SRES comparison, and the interface 255 can enable obtaining data needed for the SRES comparison.

System 200 can also include an identity provisioning function 350 for providing information to various devices including the communication device 210, and network element(s). In one embodiment, the identity provisioning function 350 can maintain a listing of the designated IMSIs and can provision identity proxy functions throughout the network with this listing. The identity provisioning function 350 can be a separate device that is in communication with the identity proxy function 250. In one embodiment, the identity provisioning function 350 can provide for OTA provisioning of the communication device 210 via a registration simulation platform as described herein, as well as propagate other information to various network elements (e.g., communicating notices of reassigned IMSIs or other information to the HLR 260, the AUC 270 and/or the EIR 280). In one embodiment, the identity provisioning function 350 can be in communication with the OTA gateway 280 and can utilize the services of the SMSC 290 to provision communication devices. The functions performed by the identity proxy function 250 and the identity provisioning function 350 in managing IMSI reuse can vary. In one embodiment, the identity proxy function 250 can be utilized as a point of IMSI screening and further determinations as to what steps should be taken to manage the particular IMSI can be made by the identity provisioning function 350 based on a detection or screening message received by the identity provisioning function 350 from the identity proxy function 250. In other embodiments, the identity proxy function 250 can take a more active role in determinations of the appropriate steps to be taken to manage the particular IMSI.

Figure 3:
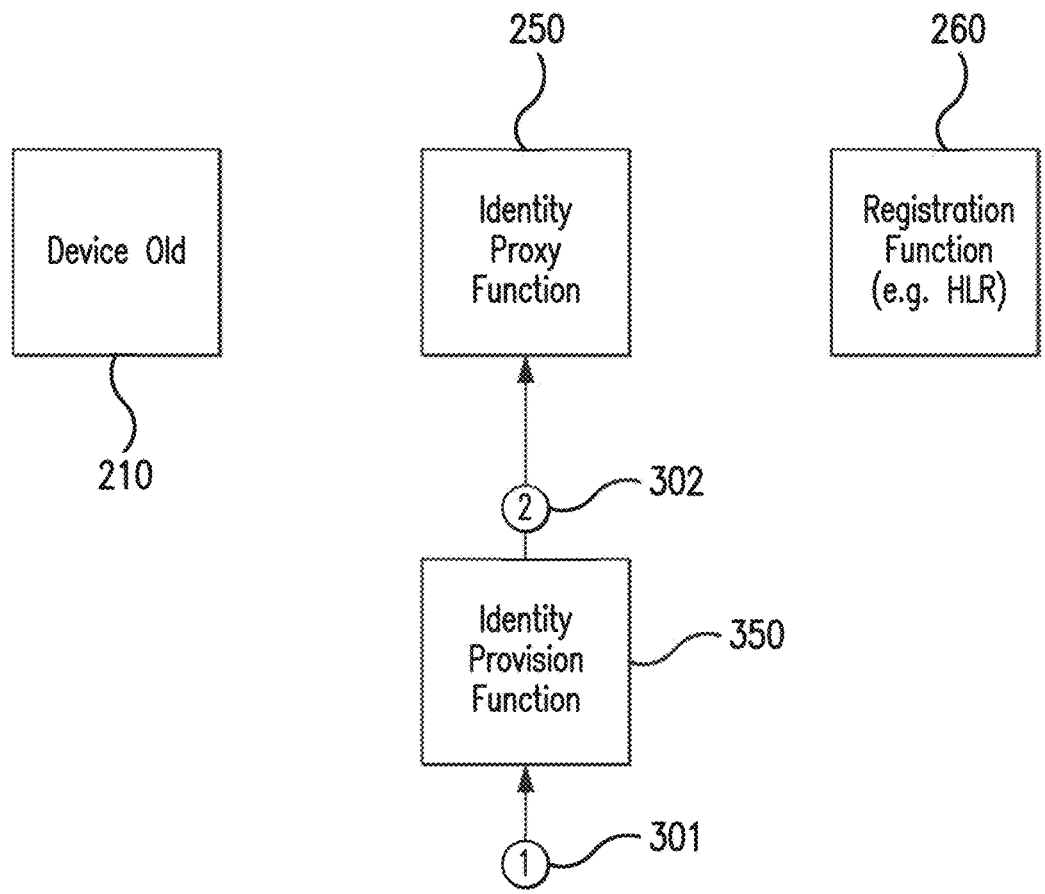
FIGS. 3-6 depict illustrative embodiments of registration processes used in portions of the system described in FIG. 1.

Referring to FIG. 3 which illustrates a portion of system 200 and may or may not include intermediate network components in the message exchange paths, the identity proxy function 250 can have access to a list of IMSIs that are designated for potential reassignment or as having already been reassigned to another communication device. For instance, the identity provisioning function 350 can maintain the listing of the designated IMSIs at 301 and can provision identity proxy functions throughout the network with this listing at 302. The listing of the designated IMSIs can be generated based on various criteria.

This provisioning information associated with the IMSIs can be utilized by the identity proxy function 250 to manage or otherwise facilitate registration by communication devices and reuse of IMSIs. For example, the identity proxy function 250 can determine that an IMSI is not included in the listing of the designated IMSIs in which case a registration request associated with that IMSI would be forwarded to the MSC 240 for completing a registration process.

As another example, the identity proxy function 250 can determine that an IMSI is included in the listing of the designated IMSIs but is not included in the subset of IMSIs that has already been reassigned in which case the identity proxy function 250 would know that an original device (which has been flagged as inactive) is attempting to register with the network. The identity proxy function 250 could then take appropriate steps for providing service to the original device, such as causing (e.g., via the identity provisioning function 350) reauthorizing use of the IMSI if services are now authorized (e.g., payment of services has been received) or causing the providing of nullification information to the original device (e.g., via the identity provisioning function 350, a registration simulation platform, the OTA 280 and/or the SMSC 290) to further cause use of the IMSI at the original device to be disabled if services are not authorized or the device/UICC are not compatible with current network service. In one or more embodiments, the identity proxy function 250 can provide a notice to the identity provisioning function of detection of a particular IMSI and the identity provisioning function 350 can then take appropriate steps for managing the reuse of IMSIs.

As another example, the identity proxy function 250 can determine that an IMSI is included in the listing of the designated IMSIs and is also included in the subset of IMSIs (which have already been reassigned). Responsive to these determinations, a further determination can be made as to whether the device is the original device associated with the IMSI prior to the reassignment or whether the device is the new device that has been reassigned the IMSI. The identity proxy function 250 and/or the identity provisioning function 350 could then take appropriate steps for allowing registration of the new device that has been reassigned the IMSI or for providing service to the original device. For instance, another IMSI can be reassigned (e.g., via the identity provisioning function 350) to the original device from the listing of designated IMSIs (which has not already been reassigned) if services are now authorized (e.g., payment of services has been received). In another embodiment, nullification information can be provided to the original device (e.g., via the identity provisioning function 350) to cause use of the original IMSI at the original device to be disabled, such as where another IMSI is to be reassigned to the original device.

In one embodiment, IMSIs can be designated for potential re-use due to suspension of services for a subscriber such as for non-payment or for another reason. In one embodiment, IMSIs can be designated for potential re-use due to a lack of use of the IMSI (or the device having a UICC that utilizes the IMSI) for a threshold time period, such as a mobile phone that has not attempted to register with a network (e.g., the GSM network or some other network including LTE or UMTS) in six months. In one embodiment, IMSIs can be designated for potential re-use according to a confirmation that the UICC has been damaged, lost, stolen and so forth. In one or more embodiments as the IMSIs are reassigned to other devices, those particular IMSIs can be further flagged as having been reassigned (i.e., flagged as a subset of the list of designated IMSIs). The identity provisioning function 350 can keep the identity proxy function 250 (as well as other identity proxy functions throughout the network) apprised of the list of designated IMSIs as well as the subset of those IMSIs that have already been reassigned to another communication device so that the identity proxy function 250 can accurately perform an IMSI screening process when registration requests are received.

Figure 4:
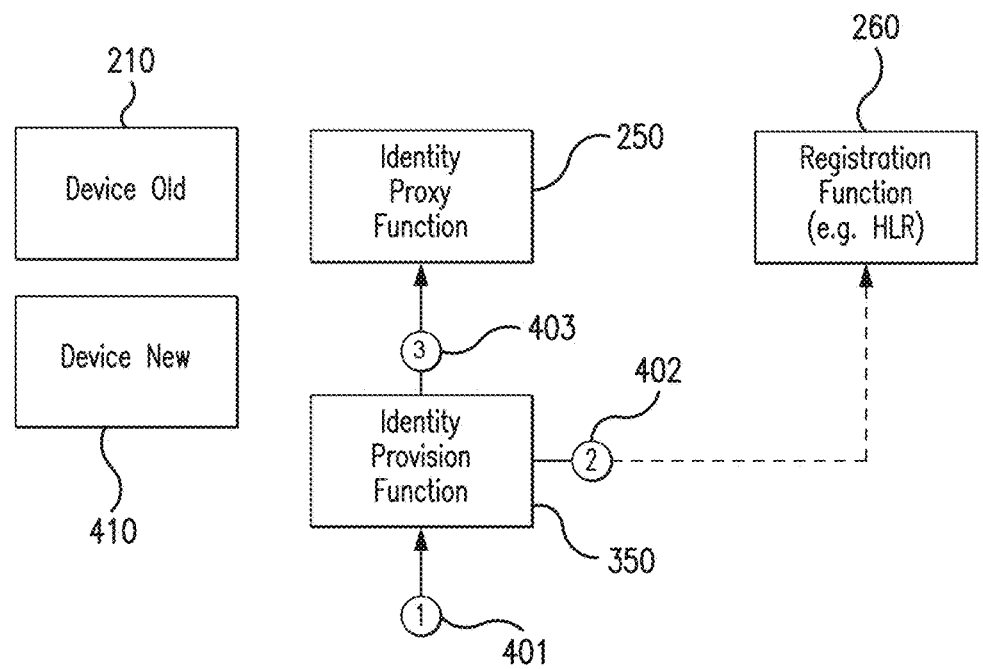

Referring to FIG. 4 which illustrates a portion of system 200 and may or may not include intermediate network components in the message exchange paths, another communication device 410 can be reassigned an IMSI from the designated IMSIs where the IMSI was previously associated with the communication device 210 (which has been flagged as inactive). In this example at 401, the identity provisioning function 350 can receive a request, be instructed or otherwise determine that the IMSI (in the list of designated IMSIs) is to be reassigned to the communication device 410. The communication device 410 can be a new device that needs an IMSI to provide communication services or an existing device that requires another IMSI due to some other reason, such as having its own IMSI reassigned to a different device.

At 402, the identity provisioning function 350 can notify the HLR 260 that the communication device 410 is now associated with the particular reassigned IMSI. This can include deleting an original IMSI assignment for the communication device 410 and/or adding the new IMSI assignment for the communication device 410 in the database of the HLR 260. In one embodiment, this notification can cause the HLR 260 to perform a database update such as re-mapping to particular HLR records, adjusting mapping with respect to MSISDNs, adjusting an identification of available communication services that the subscriber has requested or is authorized to utilize, adjusting GPRS settings to allow the subscriber to access packet services, and so forth.

At 403, the identity provisioning function 350 can notify the identity proxy function 250 that the communication device 410 is now associated with the particular reassigned IMSI. In one embodiment, the identity proxy function 250 can already be aware that the IMSI is part of a group of IMSIs designated for potential reassignment and can already be aware that the communication device 210 has been flagged as inactive. In this example, the identity proxy function 250 can switch a designation of the particular IMSI to being flagged as within the subset of the designated IMSIs that have already been reassigned to another device (i.e., the communication device 410 in this example).

Figure 5:
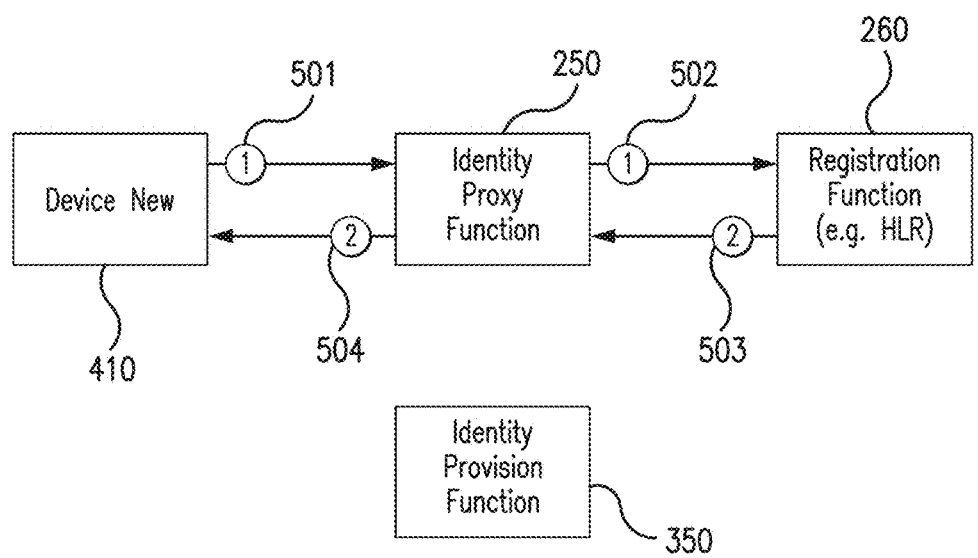

Referring to FIG. 5 which illustrates a portion of system 200 and may or may not include intermediate network components in the message exchange paths, the identity proxy function 250 facilitates registration of devices that have been reassigned IMSIs by intercepting or otherwise receiving registration requests, such as prior to the registration request being provided to the MSC 240, the VLR 245 and the HLR 260. For example at 501, the communication device 410 (which has been reassigned an IMSI from the listing of designated IMSIs where the IMSI was previously associated with the communication device 210) can request registration with the network. A registration request including the reassigned IMSI can be received by the identity proxy function 250 which determines whether or not the particular IMSI is part of the group of designated IMSIs and whether a reassignment to another device has already occurred. In one embodiment, the identity proxy function 250 and/or the identity provisioning function 350 can identify the particular device requesting registration with the network. For instance, device identification information (e.g., an IMEI) can be obtained for the communication device 410, such as being received from device 410 or from another source.

At 502, if the received IMSI is determined as having already been reassigned to another device and if the communication device 410 is determined to be that other device then identity proxy function 250 can forward the registration request to the MSC/VLR (or another registration function server) for processing of the registration of the communication device 410. At 503 and 504, messaging associated with the registration process can be exchanged such as between the HLR 260, the VLR 245, the identity proxy function 250, and/or the communication device 410.

The particular messaging that makes up the registration request and the registration process can vary. In one embodiment, the communication device 410 can send a Channel Request message to the BSS on a Random Access Channel (RACH) and the BSS can respond on an Access Grant Channel (AGCH) with an Immediate Assignment message while assigning a Stand Alone Dedicated Control Channel (SDCCH) to the communication device 410. The communication device 410 can switch to the assigned SDCCH and can send a Location Update Request to the BSS. The communication device 410 can send its IMSI to the BSS. The BSS can forward the Location Update Request/IMSI (i.e., a registration request) which is received or intercepted by the identity proxy function 250 which determines whether the received IMSI is already reassigned to another device and if the communication device 410 is that other device. If so, then the registration request is forwarded by the identity proxy function 250 to the MSC 240/VLR 245 which in turns forwards the registration request to the HLR 260, along with a request for verification of the IMSI and a request for authentication triplets (RAND, Kc, SRES). The HLR 260 can forward the IMSI to the AuC 270 and can request the authentication triplets. The AuC 270 can generate the authentication triplets and can send them, along with the IMSI, back to the HLR 260. The HLR 260 can validate the IMSI by ensuring it is allowed on the network and it is authorized for subscriber services. The HLR 260 can then forward the IMSI and the triplets to the VLR 245 which stores the SRES and the Kc, and can also forward the RAND to the BSS. The VLR 245 can utilize the BSS to authenticate the communication device 410. The BSS can send the communication device 410 an Authentication Request message with the only authentication parameter being sent in the message being the RAND. The communication device 410 can use the RAND to calculate the SRES and can send the SRES back to the BSS on the SDCCH in an Authentication Response. The BSS can forward the SRES to the VLR 245 which compares the SRES generated by the AuC with the SRES generated by the communication device. If the SRESs match then authentication is completed successfully. The exemplary embodiments can also utilize other messaging techniques and paths for registration of the communication device 410.

In one embodiment, the VLR 245 can forward the Kc for the communication device 410 to the BSS where the Kc is not sent across the air interface to the communication device. The BSS can store the Kc and can forward a Set Cipher Mode command to the communication device 410 where the command only indicates which encryption to use. The communication device 410 can switch to cipher mode using the particular encryption algorithm (e.g., A5) so that all transmissions are now enciphered and can send a Ciphering Mode Complete message to the BSS. The VLR 245 can send a Location Updating Accept message to the BSS and also generate a new Temporary Mobile Subscriber Identity (TMSI) for the communication device. The BSS can send the TMSI to the communication device 410 which can respond with a TMSI Reallocation Complete message that is forwarded to the VLR 245. The BSS can instruct the communication device 245 to go into idle mode by sending it a Channel Release message and can then de-assign the SDCCH. The VLR 245 can send an Update Location message to the HLR 260 which records the particular MSC/VLR the communication device is currently associated with.

In one embodiment such as where the identity proxy function 250 is unable to obtain device identity information (e.g., the IMEI) for the communication device 410, the identity proxy function 250 can simulate the registration process to obtain information that enables discerning whether the communication device 410 is the device that has been reassigned the IMSI or is the original device that was previously associated with the IMSI prior to the reassignment. As an example, the identity proxy function 250 can simulate the registration process so as to obtain an SRES generated by the communication device 410. From that generated SRES, the identity proxy function 250 can detect whether the communication device 410 is the device that has been reassigned the IMSI or is the original device that was previously associated with the IMSI prior to the reassignment. In this example, the identity proxy function 250 can communicate with other necessary components for obtaining data that is utilized in the registration process such as bypassing the VLR 245 and communicating via the interface 255 with the HLR 260 to obtain the authentication triplets. In this example, since the identity proxy function 250 requested the authentication triplets, the HLR 260 will obtain them from the AUC 270 and provide them back to the identity proxy function rather than providing them to the VLR 245. In one embodiment, the simulation of the registration process and the forcing of an SRES generation by the communication device 410 can be utilized to identify the particular device according to a secret key(in combination with the RAND provided by the identity proxy function 250) that the communication device would utilize in generating the SRES. The secret keys can be known or otherwise accessible to the identity proxy function 250 so that the secret key could be utilized to detect which device is generating the registration request. As an example, the secret key can be used during multiple cryptographic operations which can include the authentication of the device (e.g., in all networks) and the network (e.g., in UMTS and LTE).

In one embodiment, rather than utilizing the interface 255, system 200 can utilize first and second identity proxy functions 250 that are positioned between the communication device 210 and the MSC 240 and positioned between the VLR 245 and the HLR 260, respectively. The first and second identity proxy functions 250 can communicate with each other, such as to bypass the VLR 245 when the identity proxy functions 250 are simulating a registration process and forcing the communication device 410 to generate an SRES. In one embodiment, once the identity proxy function 250 has determined the identity of the device (original device vs. new device), the identity proxy function 250 can require that the communication device perform a re-registration.

Figure 6:
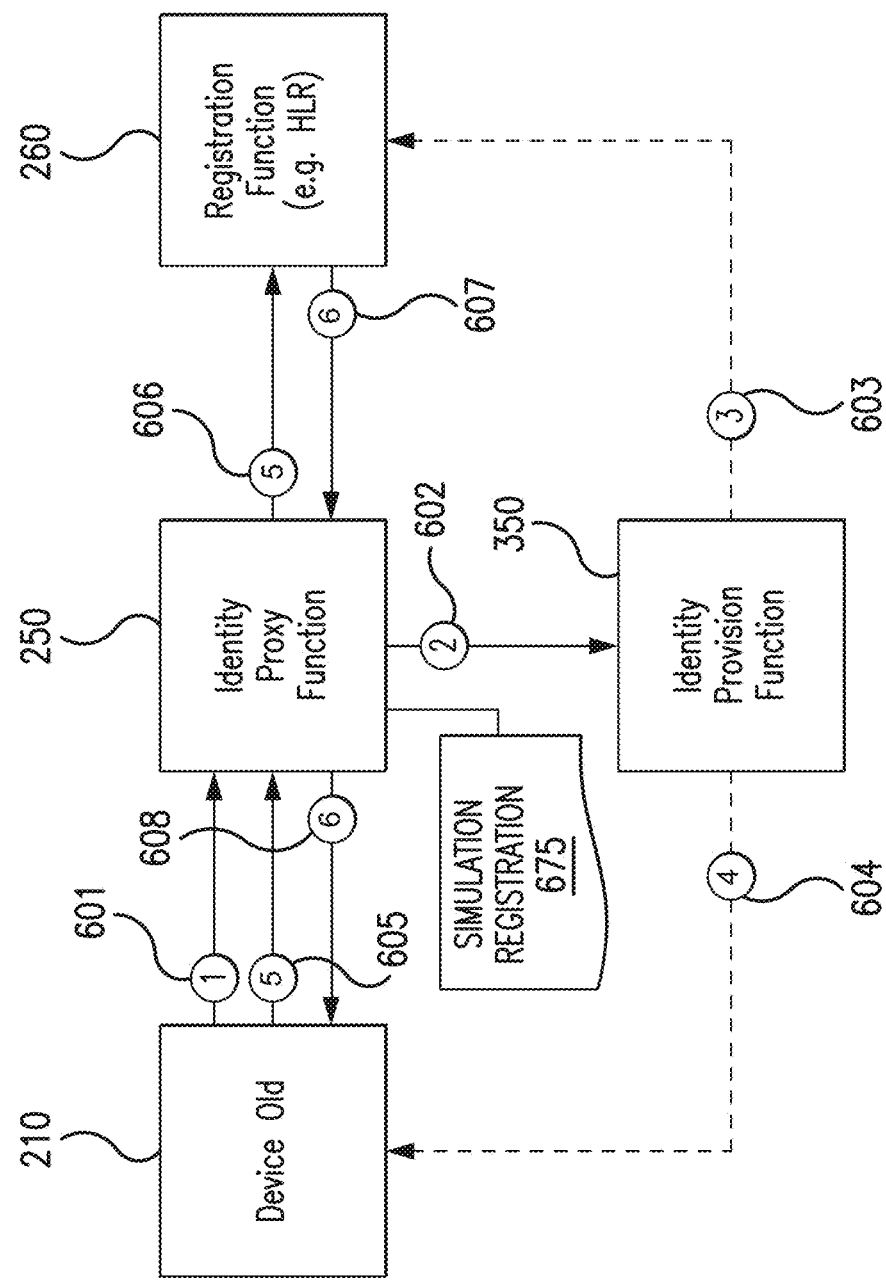

Referring to FIG. 6 which illustrates a portion of system 200 and may or may not include intermediate network components in the message exchange paths, the identity proxy function 250 facilitates registration of devices where the particular IMSI has been designated for potential reassignment or has already been reassigned by intercepting or otherwise receiving registration requests, such as prior to the registration request being provided to the MSC 240, the VLR 245 and the HLR 260. For example at 601, the original device 210 can request registration with the network. The original device 210 may have been flagged as inactive, such as for non-use over a threshold period of time, suspension of services for non-payment, a customer requesting discontinuation of services, and so forth. A registration request including the IMSI can be received by the identity proxy function 250 which determines whether or not the particular IMSI is part of the group of designated IMSIs and whether a reassignment has already occurred. In one embodiment, the identity proxy function 250 can identify the particular device requesting registration with the network. For example, device identification information (e.g., an IMEI) can be obtained for the original device 210, such as being received from device 210 (e.g., in the registration request). As another example, if the IMSI has not been reassigned but is part of the IMSIs designated for potential reassignment then the identity proxy function 250 can determine that the device requesting registration is the original device 210 that has been flagged as inactive. The identification of the device can be based on simulating the registration process and forcing a generation of an SRES by the communication device 210, as described herein.

In one embodiment, the identity proxy function 250 and/or the identity provisioning function 350 can determine whether the original device 210 is eligible for services. If the original device 210 is not eligible for services (e.g., suspension of services for non-payment or other reasons, device/UICC is no longer compatible with network or services, and so forth) then the identity proxy function 250 can cause or otherwise facilitate or enable provisioning information to be provided (e.g., via the identity provisioning function 350) to the original device 210 to cause the original device to disable its use of the IMSI. In this example, the IMSI can then be removed from the designated listing of IMSIs and can instead be included with other IMSIs (e.g., that have never been used before) that are eligible for assignment.

In one embodiment, if the IMSI has not yet been reassigned then the identity proxy function 250 and/or the identity provisioning function 350 can determine whether to allow the original device 210 to utilize that original IMSI, such as confirming that the subscriber is eligible for services (e.g., based on payment for services or other actions that removed a suspension of services). If the original device 210 is permitted to utilize its IMSI, then identity proxy function 250 can forward the registration request (based on the original IMSI) to the MSC 240/VLR 245 and can provide a notification (e.g., to the identity provisioning function 350) to remove the IMSI from the listing of designated IMSIs and to further adjust the status of the original device 210 from an inactive status to an active status.

In one embodiment, if the IMSI has already been reassigned to another device then the identity proxy function 250 and/or the identity provisioning function 350 can confirm that the subscriber of the original device 210 is eligible for services and can obtain reassignment of another IMSI (from the designated list of IMSIs) for the original device. For example at 602, responsive to a determination that the IMSI has already been reassigned to another device and a determination that the subscriber of the original device 210 is eligible for services then the identity proxy function 250 can provide a request to the identity provisioning function 350 for another IMSI from the listing of designated IMSIs (which is not in the subset of IMSIs that has already been reassigned) or the identity proxy function 250 can receive the other IMSI from the identity provisioning function 350 based on a determination made by the identity provisioning function 350. In one embodiment, the original device 210 can continue to utilize its original secret key (which is mapped to the original device by the network). In one embodiment, the determination of eligibility for services can be made by the identity provisioning function 350 such that the identity proxy function 250 transmits the request to the identity provisioning function 350 for another IMSI responsive to a determination that the IMSI has already been reassigned to another device and the identity provisioning function 350 can approve or deny the request.

Continuing with this example at 603, the identity provisioning function 350 can notify various network elements (e.g., the HLR 260) that the communication device 210 is now associated with the particular reassigned IMSI. This can include the HLR 260 deleting an original IMSI assignment for the communication device 210 and/or adding the new IMSI assignment for the communication device 210 in its database. In one embodiment, this notification can cause the HLR to perform a database update such as re-mapping to particular HLR records, adjusting mapping with respect to MSISDNs, adjusting an identification of available communication services that the subscriber has requested or is authorized to utilize, adjusting GPRS settings to allow the subscriber to access packet services, and so forth.

At 604, the identity provisioning function 350 can provide provisioning information to the communication device 210 via an OTA platform that causes the UICC to be adjusted so that the reassigned IMSI is now utilized by the device for communication services. In one embodiment, to send an OTA provisioning message to a device that has not completed registration to a target network, a simulating network can be used to intercept (e.g., prior to being received by a VLR in GSM or an MME in LTE) and complete the registration. The simulating network can send an OTA message to the device that can cause the modification of the device IMSI and can cause the device to perform a re-registration to the target network. For example, the simulating network can comprise a set of functional elements (e.g., registration simulation platform 675) that exist in the target network. This can include an MSC/VLR, a MME, a HLR or HSS, an AUC, a SMSC, an OTA platform, a SGW, a PGW, an EIR and/or any combination thereof. The AUC of registration simulation platform 675 can contain the secret key of the device and the HSS/HLR can be provisioned to allow the device to register. Other pre-provisioning functions can be performed. For instance, the registration simulation platform 675 can be integrated into the identity proxy function 250 (illustrated in FIG. 6), the identity provisioning function 350 and/or can exist as a standalone device. In one embodiment, the identity provisioning function 350 can become aware of the registration to the registration simulation platform 675 by notification from the registration simulation platform 675 and/or from the identity proxy function 250. In this example, the identity provisioning function 350 can instruct the registration simulation platform 675 to perform an OTA to modify an IMSI of that particular device. The identity provisioning function 350 may provide an update to the identity proxy function 250 regarding the content of the requested OTA.

In another embodiment, the identity provisioning function 350 can provide provisioning information to the communication device 210 via the OTA 280 and the SMSC 290 that causes the UICC to be adjusted so that the reassigned IMSI is now utilized by the device for communication services. In another embodiment at 605, the communication device 210 can then attempt to re-register utilizing the reassigned IMSI. The identity proxy function 250 can receive the registration request for the communication device 210, which now includes the reassigned IMSI and at 606-608 the registration process (via the VLR 245 and the HLR 260) can be completed based on the reassigned IMSI. In one or more embodiments, the identity provisioning function 350 can provision a National SIM Manager (NSM) with the reassigned IMSI for the original device where the secret key of the original device is already known. In another embodiment, the identity provisioning function 350 can be integrated with equipment of the NSM. In one embodiment, a billing system can detect the change in IMSI for the UICC and can provision some or all other network elements necessary for enabling call processing (e.g., HLR 260, AUC 270).

Figure 7:
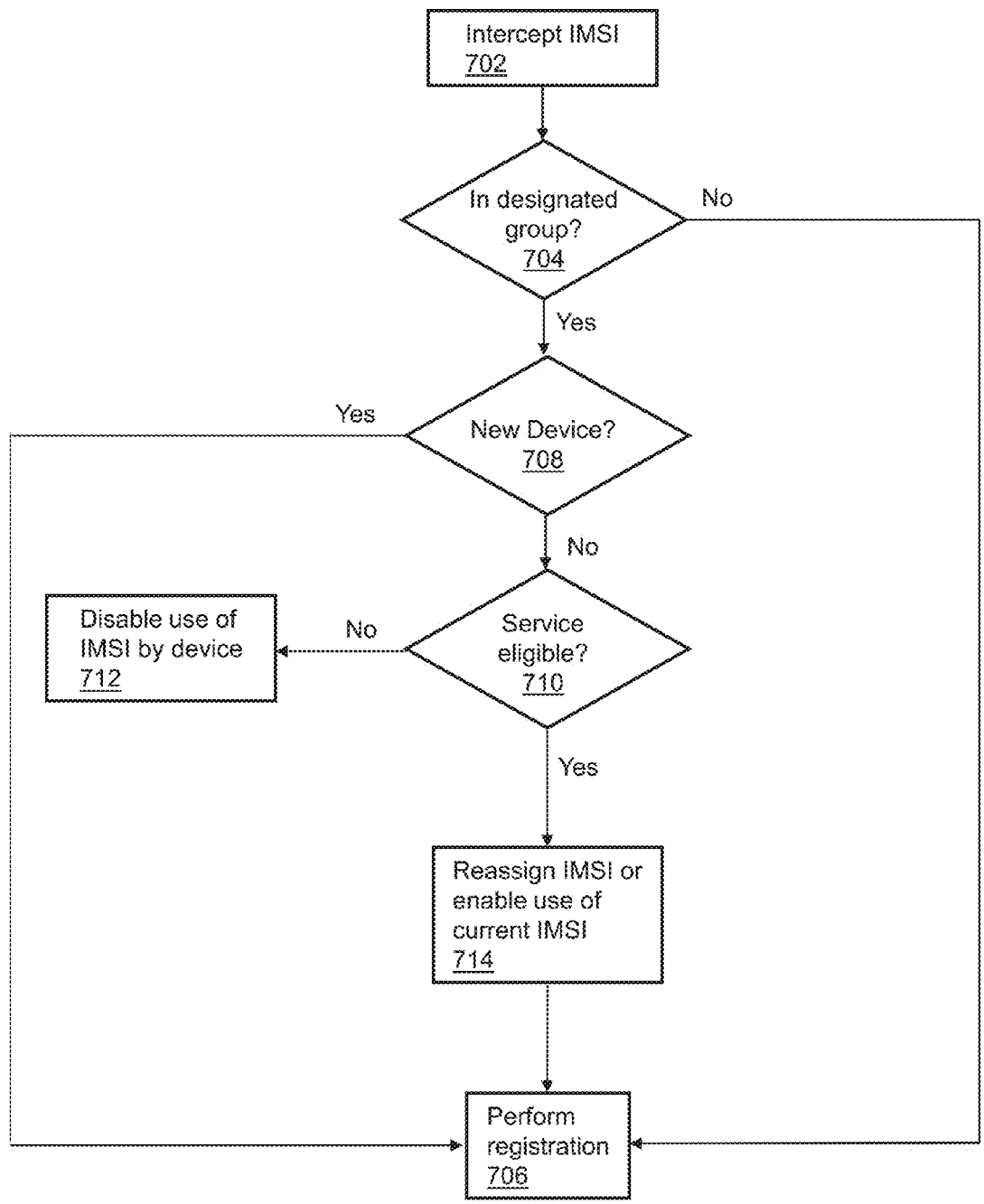
FIG. 7 depicts an illustrative embodiment of a method that provides communication services and enables re-using mobile Subscriber Identification Information by other devices.

FIG. 7 depicts an illustrative embodiment of a method 700 used by system 200 for facilitating the re-use of IMSIs. One or more of the steps of method 700 can be performed by the identity proxy function 250, the identity provisioning function 350 and/or by other devices described in FIGS. 2-6. At 702, an IMSI can be received that is associated with a communication device. For instance, the IMSI can be part of a registration request that is generated by or caused to be generated by the communication device. At 704, a determination of the status of the ISMI can be made. For example, the identity proxy function 250 can determine whether the IMSI is included in a designated group of IMSIs and if so can further determine whether the IMSI is included in a subset of the group which is further designated as having already been reassigned to another communication device. If the IMSI is not part of the designated group of IMSIs then the registration process can be continued by forwarding the registration request and/or IMSI to the MSC 240/VLR 245 to perform the registration at 706. If on the other hand the IMSI is part of the designated group of IMSIs then a determination can be made at 708 as to whether the registration request is for an original device that was associated with the IMSI (e.g., prior to being reassigned) or whether the registration request is for a new device that has been reassigned the IMSI. The identification of the particular device can be performed in a number of different ways, such as based on device identification information (e.g., IMEI), simulating a registration process to force an SRES generation by the device from which the device identification can be determined, and so forth.

If the registration request and the IMSI are from a new device that has been reassigned the IMSI then the registration process can be continued by forwarding the registration request and/or IMSI to the MSC 240/VLR 245 to perform the registration at 706. If on the other hand the registration request and the IMSI are from an original device (e.g., a device that the IMSI was previously associated with prior to being added to the listing of designated IMSIs) then a determination can be made at 710 as to whether the subscriber of the original device is eligible for communication services. Eligibility for services can be based on various factors and can be determined by various components or a combination of components, such as based on billing, device hardware requirements, device software requirements, and so forth. If the subscriber of the original device is not eligible for communication services then at 712 provisioning information can be provided to the original device (e.g., via OTA provisioning by the identity provisioning function 350 such as through use of registration simulation platform 675) that causes disabling the use of the particular IMSI by the original device. In one embodiment, if the IMSI has not already been reassigned then it can be removed from the listing of designated IMSIs and provided to another communication device (e.g., the identity proxy function 250 can forward the IMSI automatically to the MSC240/VLR 245 for completion of registration associated with a new device that utilizes the IMSI).

If on the other hand the subscriber of the original device is eligible for communication services then at 714 the original device can be authorized to utilize the particular IMSI (e.g., if it is determined that the particular IMSI has not yet been reassigned) or the original device can be provisioned with another IMSI (e.g., if it is determined that the original IMSI has already been reassigned to another device). In one embodiment, the new IMSI reassigned to the original device can be selected from the listing of designated IMSI (which is not included in the subset of IMSIs that has already been reassigned). Method 700 can then proceed to 706 where the registration process is completed.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, eligibility for services can be determined according to a viability of the UICC. For example, if it is determined that the UICC is no longer compatible with the network (e.g., it cannot perform certain functions requested by the network or cannot facilitate certain communication services) then the device/UICC can be designated as being ineligible for service and provisioning information can be sent to the device (e.g., via registration simulation platform 675) to nullify or otherwise disable use of the IMSI by that device/UICC. In one embodiment, if it is determined that the UICC is not viable or otherwise is incompatible with the network then the subscriber of the original device can be provided with a request to upgrade the UICC (which may or may not utilize the same IMSI), such as forwarding a message including an offer to the original device. In this example, the IMSI can be removed from the listing of designated IMSIs. One or more of the determinations described with respect to any of the exemplary embodiments can be made by the identity proxy function 250, the identity provisioning function 350, or another network device.

Figure 8:
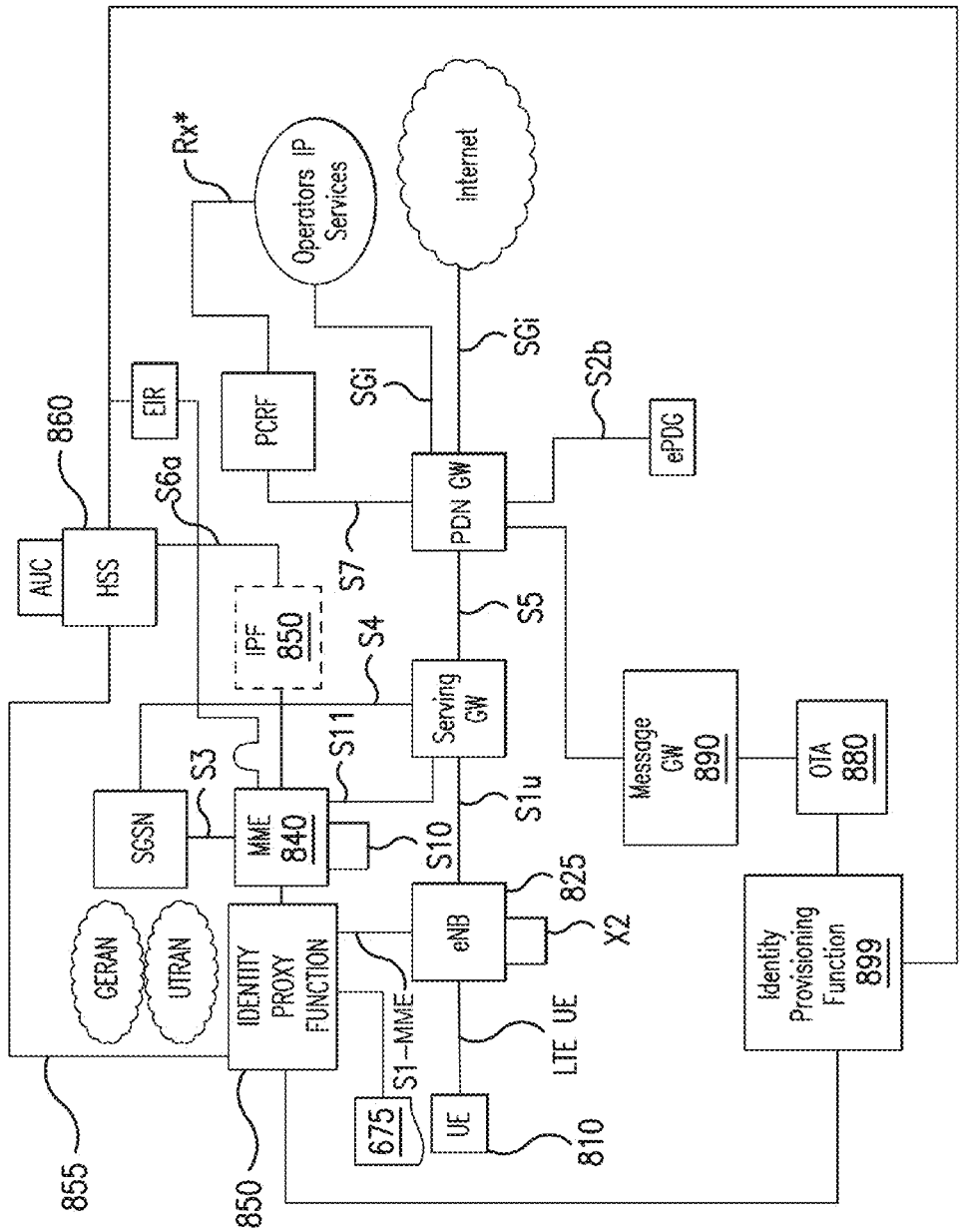
FIG. 8 depicts another illustrative embodiment of a system that provides communication services and enables re-using mobile Subscriber Identification Information by other devices.

FIG. 8 depicts an illustrative embodiment of a communication system 800 (e.g., a Long Term Evolution (LTE) system) that provides communication services such as to a communication device 810. The communication device 810 can be various types of devices such as a mobile phone or other devices that utilize an IMSI for establishing communication services. The types of communication services can vary including voice services, video, data and/or messaging. System 800 enables IMSI re-use by the same or other communication devices through use of an identity proxy function 850 and an identity provisioning function 899. System 800 can perform many of the same functions as described with respect to system 200 including intercepting a registration request with an IMSI, determining an identity of a device requesting registration, processing registration requests according to whether the IMSI is a designated IMSI and whether the IMSI has already been reassigned to another device, reassigning an IMSI to an original device that has come back online, reauthorizing use of an original IMSI for an original device that has returned to being service eligible, and so forth.

System 800 can utilize the identity proxy function 850 to perform functions similar to those described with respect to the identity proxy function 250 of system 200 for facilitating the re-use of IMSIs. System 800 can include various components that facilitate providing the communication services, including an eNodeB (eNB) 825 that functions as hardware that communicates directly wirelessly with mobile handsets similar to the BSS of the GSM network of system 200, a Mobility Management Entity (MME) 840 that functions as a control-node for the LTE access-network, and a Home Subscriber Server (HSS) 860 that functions as a central database to contain user-related and subscription-related information and which provides user authentication and access authorization functionality. The HSS 860 is similar to the HLR 260 and AUC 270 of the GSM network of system 200. Other components can also be included in the system 800 such as an EIR, S-GW, PDN GW, ePDG, SGSN and so forth.

In one or more embodiments, the identity proxy function 850 can be positioned between the eNB 825 and the MME 840 so that the IMSI is received by the identity proxy function 850 prior to being processed by the MME 840. In one embodiment, an interface 855 can be established between the identity proxy function 850 and other network components, such as the HSS 860. For example, the interface 855 can enable the identity proxy function 850 to communicate directly with the HSS 860 so as to bypass communication with the MME 840. For instance and as described herein, the identity proxy function 850 can simulate function(s) of the MME 840 such as RES comparison and the interface 855 can enable obtaining data needed for the RES comparison.

System 800 can utilize an identity provisioning function 899 for provisioning information to the communication device 810, such as a reassigned IMSI, nullification information that disables the use of an old IMSI at an original device, an offer to obtain a reassigned IMSI, and so forth. In one embodiment, identity provisioning function 899 can also propagate other information to other network elements, such as notifications that an IMSI from the listing of designated IMSIs has been reassigned or has been removed from the IMSI, an inactive or active status change for a device, and so forth to various network elements such as the HSS 860, the EIR, and so forth. The provisioning or propagation of information to the communication device 810 can be performed in a number of different ways, including utilizing a registration simulation platform (e.g., performing function similar to that of registration simulation platform 675 in FIG. 6, an OTA gateway 880 and/or a messaging gateway 890. The functions performed by the identity proxy function 850 and the identity provisioning function 899 in managing IMSI reuse can vary. In one embodiment, the identity proxy function 850 can be utilized as a point of IMSI screening and further determinations as to what steps should be taken to manage the particular IMSI can be made by the identity provisioning function 899 based on a detection or screening message received by the identity provisioning function 899 from the identity proxy function 850. In other embodiments, the identity proxy function 850 can take a more active role in determinations of the appropriate steps to be taken to manage the particular IMSI.

In one embodiment, the HSS 860 can be provisioned with reassigned IMSIs to facilitate the registration of a new device that has received a reassigned IMSI from an original device. In one embodiment, the identity proxy function 850 can simulate a registration process to force the communication device 810 to generate a RES (similar to the process described with respect to FIG. 5) so that the identity proxy function 850 can determine whether the device requesting registration is an original device or a new device.

In one embodiment, the identity proxy function 850 can obtain an IMSI of the communication device 810 attempting to register and can determine the identity of that device. Based upon the IMSI and the identity of the communication device 810, a determination can be made (e.g., by the identity proxy function 850 and/or the identity provisioning function 899) whether to allow the registration to proceed (to the MME 840), reassign an IMSI to the communication device, provide provisioning information that disables use of the IMSI by the communication device and/or take other appropriate actions to facilitate managing use and reuse of IMSI.

For example, the communication device 810 can initiate an attach procedure by transmitting an attach request to the eNB 825 so that the eNB can derive the appropriate MME from the Radio Resource Control (RRC) parameters carrying the old Globally Unique Mobility Management Entity Identifier (GUMMEI) and the indicated Selected Network. The attach request (i.e., registration request) can be received by the identity proxy function 850 (e.g., from the eNB 825). In one embodiment, the attach request can include a Globally Unique Temporary UE Identity (GUTI) which has the GUMMEI and also has the M-TMSI, which identifies the particular device. This identification allows the identity proxy function 850 to ascertain whether the particular device is a new device that has been reassigned the IMSI from the listing of designated IMSIs or is the original device that was previously associated with the IMSI prior to the reassignment. In this example, the identity proxy function 850 can obtain the IMSI in a number of different ways. For example, if the communication device 810 identifies itself with a GUTI, then the GUTI can be used to derive the old MME/SGSN address, and an Identification Request can be sent to the old MME/SGSN to request the IMSI. In another embodiment, the identity proxy function 850 can send an Identity Request to the communication device 810 to request the IMSI.

In one embodiment such as where the identity proxy function 850 is unable to obtain device identity information (e.g., the GUTI) for the communication device 810, the identity proxy function 850 can simulate the registration process of the MME 840 to obtain information that enables discerning whether the communication device 810 is a new device that has been reassigned the IMSI or is the original device that was previously associated with the IMSI prior to the reassignment. As an example, the identity proxy function 850 can simulate the registration process of the MME 840 so as to obtain a RES generated by the communication device 810 according to an EPS AKA algorithm. From that generated RES, the identity proxy function 850 can detect whether the communication device 810 is the new device that has been reassigned the IMSI or is the original device that was previously associated with the IMSI prior to the reassignment. In this example, the identity proxy function 850 can communicate with other necessary components for obtaining data that is utilized in the registration process (e.g. a mutual authentication process) such as bypassing the MME 840 and communicating via the interface 855 with the HSS 860 to obtain authentication vectors (e.g., RAND, AUTN, XRES, $K_{ASME}$). The HSS 860 generates authentication vector(s) using the EPS AKA algorithm and forwards them back to the identity proxy function 850. The identity proxy function 850 can select one of the authentication vectors (if more than one was received) and can use it to perform mutual authentication with the communication device 810 by forwarding the RAND and $AUTN_{HSS}$ to the communication device, which then computes RES, $AUTN_{UE}$ and $K_{ASME}$ using the EPS AKA algorithm. The communication device 810 can then compare its own $AUTN_{UE}$ and $AUTN_{HSS}$ received from the identity proxy function 850. Once authenticated, the communication device 810 can forward the RES to the identity proxy function 850, which can then determine from a comparison of the ACRES received from the HSS 860 with the RES generated by the communication device whether the particular device is the original device or the new device since different RESs will be generated based on different encryption keys (LTE K) stored at different UICCs. In this example, since the identity proxy function 850 requested the authentication vectors, the HSS 860 will provide them back to the identity proxy function via interface 855 rather than providing them to the MME 840.

In one embodiment, rather than utilizing the interface 855, system 800 can utilize first and second identity proxy functions 850 that are positioned between the communication device 810 and the MME 840 and positioned between the MME 840 and the HSS 260 (shown in dashed lines in FIG. 8), respectively. The first and second identity proxy functions 850 can communicate with each other, such as to bypass the MME 840 when the identity proxy functions 850 are simulating a registration process of the MME 840 and forcing the communication device 810 to generate a RES. In one embodiment, once the identity proxy function 850 has determined the identity of the device (original device vs. new device), the identity proxy function 850 can require that the communication device 810 perform a re-registration.

In one or more embodiments, system 800 enables receiving, by the identity proxy function 850, a registration request associated with the communication device 810 where the registration request includes an IMSI of the communication device. System 800 enables accessing, by the identity proxy function 850, information that identifies a group of IMSIs and that indicates a subset of the group of IMSIs that have been reassigned to other communication devices. Responsive to a first determination that the IMSI is not included in the group of IMSIs or a second determination that the IMSI is included in the subset of the group of IMSIs, system 800 enables providing, by the identity proxy function 850, the registration request to a registration function (e.g., the MME 840 and/or the HSS 860) for completing a registration process for the communication device which allows for communication services at the communication device. In one embodiment, system 800 enables receiving, by the identity proxy function 850, device identification data for the communication device 810. A third determination can then be performed as to whether the communication device 810 is one of the other communication devices that has received a reassignment of one of the subset of the group of international mobile subscriber identities, where the third determination is based on the device identification data, and where the providing the registration request to the registration function for completing the registration process is according to the third determination. In one embodiment, the device identification data comprises an IMEI. In one embodiment, the IMEI is obtained from the communication device 810. In one embodiment responsive to a third determination that the IMSI is included in the subset of the group of IMSIs and that the communication device 810 is not one of the other communication devices that has received a reassignment of one of the subset of the group of IMSIs, system 800 enables providing, via the identity provisioning function 899, the communication device with provisioning information. The provisioning information causes one of disabling use of the IMSI by the communication device, reassignment of another IMSI from the group of IMSIs that is not included in the subset of the group of IMSIs, or a combination thereof. In one embodiment, the system 800 enables receiving, by the identity proxy function 850, an IMEI from the communication device 810, wherein the third determination is based on the IMEI. In one embodiment responsive to a third determination that the communication device 810 is eligible for service, that the IMSI is included in the group of IMSIs, and that the IMSI is not included in the subset of the group of IMSIs, the system 800 enables removal of the IMSI from the group of IMSIs and further enables providing, by the identity proxy function 850, the registration request to the registration function for completing the registration process for the communication device. In one embodiment, system 800 enables determining a functionality of a universal integrated circuit card of the communication device 810 that stores the IMSI, where the removal of the IMSI from the group of IMSIs and the providing the registration request to the registration function are based on a fourth determination that the functionality of the universal integrated circuit card is compatible with the communication services associated with the communication device. In one embodiment, the identity proxy function 850 is a stand-alone server located between the eNB 825 and the MME 840, and the registration function is performed by the MME 840 utilizing services of the HSS 860. In one embodiment, the provisioning information can be provided to the communication device by the identity provisioning function via an OTA interface, where the OTA instructions go through the identity proxy function 850.

In one embodiment, the system 800 enables receiving, by the identity proxy function 850, a signed response message generated by the communication device 810 based on a random challenge; and performing, by the identity proxy function, a third determination that the communication device is one of the other communication devices that has received a reassignment of one of the subset of the group of IMSIs, where the third determination is based on the signed response message, and where the providing the registration request to the registration function for completing the registration process is according to the third determination. In one embodiment, the system 800 enables providing, by the identity proxy function 850, the random challenge to the communication device 810.

Figure 9:
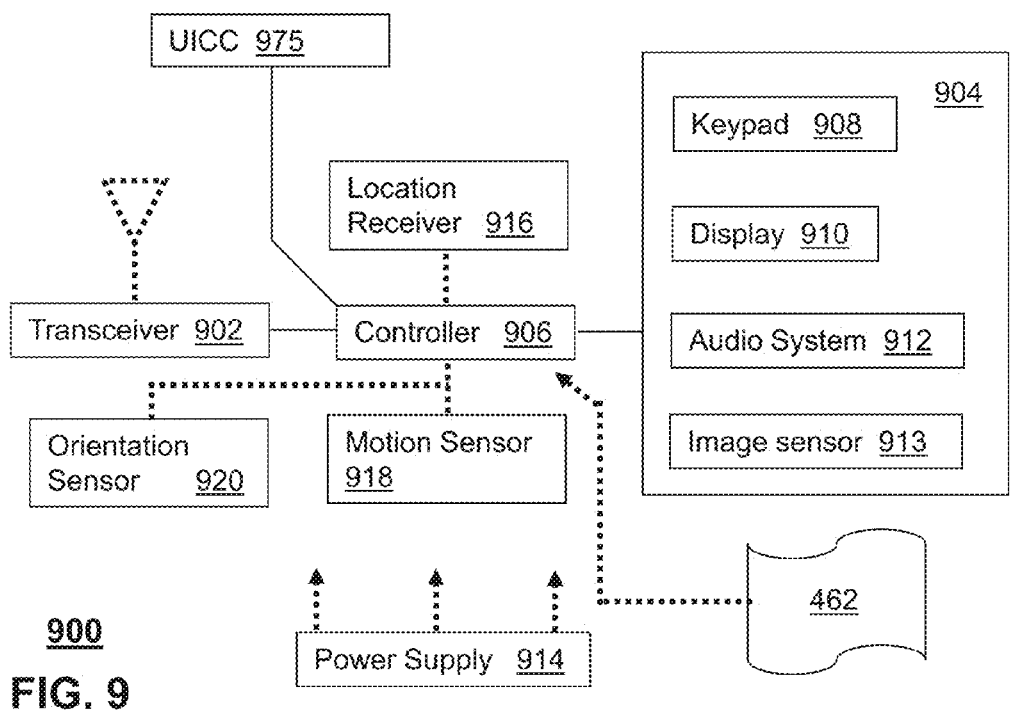
FIG. 9 depicts an illustrative embodiment of a communication device that can be utilized in either or both of the systems of FIGS. 2 and 8 and/or can be utilized during the method of FIG. 7.

FIG. 9 depicts an illustrative embodiment of a communication device 900. Communication device 900 can serve in whole or in part as an illustrative embodiment of the devices depicted in FIGS. 2-6 and 8 and can be configured to perform portions of method 700 of FIG. 7. Where communication device 900 is an end user device, it can include a UICC 975 that stores or otherwise manages use of an IMSI for registering the communication device. In one embodiment, the communication device 900 can be an end user device that performs operations including: providing a registration request that is received by an identity proxy function operating in a server, where the registration request includes a first IMSI of the communication device; responsive to a determination that the first IMSI has been reassigned to another communication device and that the communication device 900 is not the other communication device, receiving provisioning information that includes a second IMSI; and facilitating a registration process that utilizes the second IMSI and that enables communication services at the communication device. In one embodiment, the provisioning information includes disabling information that disables use of the first IMSI by the communication device 900, where the registration process utilizes a secret key that was previously associated with the first IMSI prior to the first IMSI being reassigned to the other communication device, and where the receiving of the provisioning information is responsive to determining that the communication device is eligible for the communication services.

In another embodiment, the communication device 900 can be a network device (e.g., a network server executing the identity proxy function 250, 850 and/or the identity provisioning function 350, 899) that performs operations including: receiving an IMSI of a communication device; accessing information that identifies a group of IMSIs and that indicates a subset of the group of IMSIs that have been reassigned to other communication devices; and, responsive to a first determination that the IMSI is included in the subset of the group of IMSIs and that the communication device is not one of the other communication devices that has received a reassignment of one of the subset of the group of IMSIs, providing the communication device with provisioning information that disables use of the IMSI by the communication device. In one embodiment, the communication device 900 can, responsive to determining that use of the IMSI by the communication device has been nullified, provide a notification to or otherwise perform a removal of the IMSI from the group of IMSIs. In one embodiment, the communication device 900 can, receive an IMEI from the communication device, where the first determination is based on the IMEI. In one embodiment, the communication device 900 can, perform a second determination that the communication device is not service eligible, where the providing the communication device with the provisioning information is responsive to the second determination. In one embodiment, the communication device 900 can, responsive to a second determination that the IMSI is included in the subset of the group of IMSIs and that the communication device is one of the other communication devices that has received a reassignment of one of the subset of the group of IMSIs, providing a registration request to a registration function for completing a registration process for the communication device that enables communication services at the communication device. In one embodiment, the provisioning information enables reassignment of another IMSI from the group of IMSIs that is not included in the subset of the group of IMSIs, and where the communication device 900 can provide a registration request to a registration function for completing a registration process for the communication device utilizing the other IMSI. In one embodiment, the registration process for the communication device utilizing the other IMSI is further based on a secret key that was previously associated with the IMSI prior to the reassignment of the other IMSI to the communication device.

Communication device 900 can include more or less than the components described herein. For example, communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing the UICC 975 (where it is not an embedded UICC). The UICC 975 can be various types of UICCs and can be a Subscriber Identity Module (SIM) card. The UICC 975 can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of the devices of FIGS. 2-6 and 8 including communication devices 210, 410, 810, as well as the identity proxy functions 250, 850, the identity provisioning functions 350, 899 and other network components described herein. It will be appreciated that the communication device 900 can also represent other devices that can operate in systems 200 and 800. In addition, the controller 906 can be adapted in various embodiments to perform the functions 462 which enables management of the re-use of IMSIs.

Upon reviewing the aforementioned embodiments, it would be evident to an artisan with ordinary skill in the art that said embodiments can be modified, reduced, or enhanced without departing from the scope of the claims described below. For example, other factors can be utilized to determine whether an original device should receive an IMSI from the designated group of IMSIs (which has not yet been reassigned) or whether the original device should continue to utilize the original IMSI. For instance, even though the original IMSI may not yet have been reassigned, the service provider may desire to reassign another IMSI (from the designated IMSI to be reassigned) such as to facilitate categorizing devices and/or subscribers based on particular groupings of IMSIs.

The exemplary embodiments have been described with respect to GSM and LTE networks 200, 800, respectively. However, the exemplary embodiments can be utilized for managing use of IMSIs in various types of networks. For example in a Universal Mobile Telecommunications System (UMTS) network, IMSI management can be performed as described in the exemplary embodiments by intercepting a registration request utilizing an identity proxy function (e.g., positioned between the BSS and the Serving GPRS Support Node (SGSN)). In another example in a General Packet Radio Service (GPRS) network, IMSI management can be performed as described in the exemplary embodiments by intercepting a registration request utilizing an identity proxy function.

In one or more embodiments, other steps or procedures can be implemented when an original device that has been flagged as inactive attempts to register with the network. For example, when an original device whose original IMSI has been re-assigned to another device is detected during a registration request, the network can limit interaction of the original device with the network. For instance, the UICC of the original device can be forced to use a default IMSI which has limited functionality such as being limited to bootstrap functions (e.g., functions that enable communicating with the network for administrative reasons including obtaining a reassigned IMSI), a pay for service mode, and so forth. For instance, a pay for service mode can be implemented by the default IMSI by allowing registration that enables access to a webpage for selecting and paying for particular communication services, such as messaging, voice calls, and so forth. In one embodiment, the default IMSI can be stored by the UICC in addition to the original IMSI. In one embodiment, the provisioning information provided to the UICC can cause the UICC to utilize the default IMSI instead of the original IMSI. In another embodiment, the identity provisioning function 350, 899 can provision the default IMSI to the original device rather than provisioning an IMSI from the designated group of IMSIs.

In one or more embodiments, the intercepting of the IMSI and determining whether to allow registration to continue by the identity proxy function 250, 850 prevents a failure or other error message from being generated and/or from being provided to the communication device which could have adverse effects on the communication device such as disabling OTA interface of the communication device.

In one or more embodiments, the identity proxy function 250, 850 can cache or otherwise store last successful registration processes for particular devices to utilize that information for determining whether a device requesting registration is an original device or a new device with a reassigned IMSI. In one embodiment, the device identification information (e.g., an IMEI) can be sourced by one or more other network elements.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or or wired paths that utilize one or more of various protocols or methodologies, where the coupling and/or connection can be direct (e.g., no intervening processing device) and/or indirect (e.g., an intermediary processing device such as a router).

Figure 10:
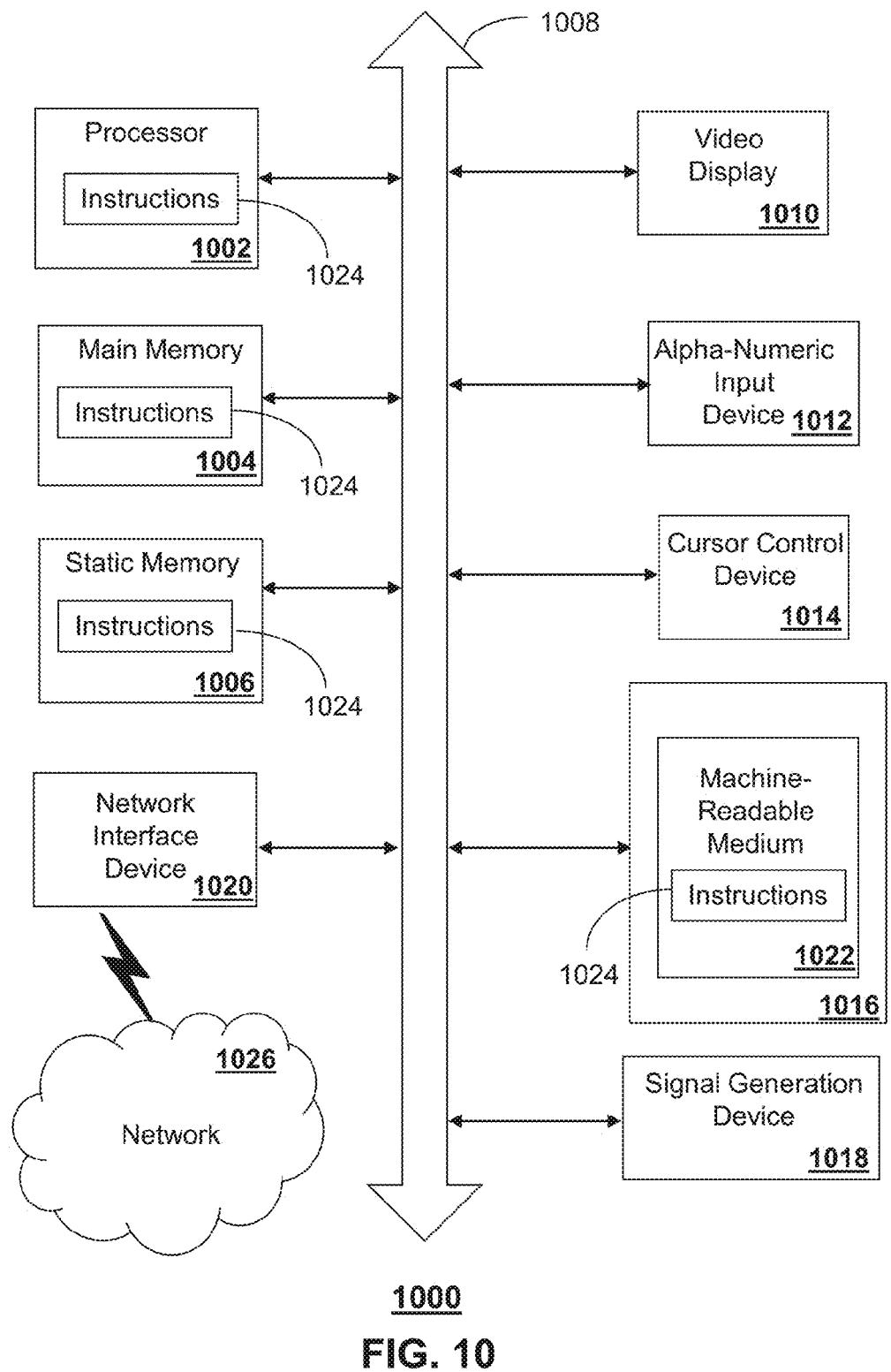
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the identity proxy functions 250, 850 and/or the identity provisioning functions for intercepting IMSIs, determining identities of devices, and/or managing the reuse of the IMSIs. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a processing system including a processor, a registration request associated with a first communication device, wherein an international mobile subscriber identity is associated with the first communication device;
determining, by processing system, whether the international mobile subscriber identity is included in a subset of a group of designated international mobile subscriber identities, wherein the designated international mobile subscriber identities in the subset have been reassigned from communication devices;
determining, by the processing system, whether the international mobile subscriber identity has been reassigned to the first communication device according to device identification data associated with the first communication device; and
responsive to a determination that the international mobile subscriber identity is included in the subset of the group of the designated international mobile subscriber identities and a determination that the international mobile subscriber identity has been reassigned to the first communication device, providing, by the processing system, the registration request to a registration function to complete a registration process for the first communication device.

2. The method of claim 1, wherein the processing system operates at an identity proxy function.

3. The method of claim 1, further comprising accessing, by the processing system, information that identifies the group of the designated international mobile subscriber identities and the subset of the group of the designated international mobile subscriber identities.

4. The method of claim 1, further comprising, responsive to a determination that the international mobile subscriber identity is not included in the group of the designated international mobile subscriber identities, providing, by the processing system, the registration request to a registration function to complete a registration process for the first communication device.

5. The method of claim 1, further comprising, responsive to a determination that the international mobile subscriber identity is included in the group of the designated international mobile subscriber identities, a determination that the international mobile subscriber identity is included in the subset of the group of the designated international mobile subscriber identities, and a determination that the international mobile subscriber identity has not been reassigned to the first communication device, providing, via an identity provisioning function, the first communication device with provisioning information for disabling use of the international mobile subscriber identity by the communication device.

6. The method of claim 1, further comprising, responsive to a determination that the international mobile subscriber identity is included in the group of the designated international mobile subscriber identities, a determination that the international mobile subscriber identity is included in the subset of the group of the designated international mobile subscriber identities, and a determination that the international mobile subscriber identity has not been reassigned to the first communication device, providing, via an identity provisioning function, the first communication device with provisioning information to reassign, to the first communication device, second international mobile subscriber identity from the group of the designated international mobile subscriber identities that is not included in the subset of the group of the designated international mobile subscriber identities.

7. The method of claim 1, wherein the device identification data comprises an international mobile station equipment identity number or a Globally Unique Temporary UE Identity.

8. The method of claim 7, wherein the international mobile station equipment identity number is obtained from the registration request.

9. The method of claim 7, comprising receiving, by the processing system, the international mobile station equipment identity number or the Globally Unique Temporary UE Identity from the communication device.

10. The method of claim 1, further comprising:
determining, by the processing system, whether the first communication device is eligible for communication services; and
responsive to a determination that the communication device is eligible for service, determination that the international mobile subscriber identity is included in the group of the designated international mobile subscriber identities, and a determination that the international mobile subscriber identity is not included in the subset of the group of the designated international mobile subscriber identities:
removing, by the processing system, the international mobile subscriber identity from the group of the designated international mobile subscriber identities; and
providing, by the processing system, the registration request to the registration function for completing the registration process for the first communication device that enables the communication services at the first communication device.

11. The method of claim 10, comprising:
determining, by the processing system, a functionality of a universal integrated circuit card of the first communication device that stores the international mobile subscriber identity is compatible with the communication services, wherein the removing of the international mobile subscriber identity from the group of designated international mobile subscriber identities and the providing of the registration request to the registration function are further responsive to a determination that the functionality of the universal integrated circuit card is compatible with the communication services.

12. The method of claim 1, wherein the processing system is part of a server located between a base station subsystem and a mobile switching center, and wherein the registration function is performed by a visitor location register and by a home location register that communicate with an authentication center.

13. The method of claim 1, comprising:
providing, by the processing system, a random challenge to the first communication device; and
receiving, by the processing system, a signed response message generated by the first communication device based on the random challenge,
wherein the international mobile subscriber identity is further determined to have been reassigned to the first communication device based on the signed response message.

14. The method of claim 1, wherein the processing system is part of a server located between an eNodeB and a mobility management entity, and wherein the registration function is performed by the mobility management entity that communicates with a home subscriber server.

15. A communication device, comprising:
a processing system including a processor; and
a memory that stores executable instructions that, when executed by the processing system, facilitate performance of operations, comprising:
transmitting a registration request including an international mobile subscriber identity of the communication device;
responsive to a determination that the international mobile subscriber identity is included in a group of designated international mobile subscriber identities, a determination that the international mobile subscriber identity is included in a subset of the group of the designated international mobile subscriber identities, and a determination that the international mobile subscriber identity has not been reassigned to the communication device, receiving provisioning information to reassign, to the communication device, a second international mobile subscriber identity from the group of the designated international mobile subscriber identities that is not included in the subset of the group of the designated international mobile subscriber identities; and
facilitating a registration process that utilizes the second international mobile subscriber identity and that enables communication services at the communication device.

16. The communication device of claim 15, wherein the operations further comprise receiving, via the identity provisioning function, provisioning information for disabling use of the international mobile subscriber identity by the communication device.

17. The communication device of claim 15, wherein the registration request is received by an identity proxy function operating in a server.

18. The communication device of claim 17, wherein the identity proxy function is located between an eNodeB and a mobility management entity, and wherein the registration process is performed by a mobility management entity that communicates with a home subscriber server.

19. A non-transitory machine-readable storage medium, comprising executable instructions that, when executed by a processing system of a communication device that includes a processor, facilitate performance of operations, comprising:
receiving, by an identity proxy function, an international mobile subscriber identity of a communication device; and
responsive to a determination that the international mobile subscriber identity is included in a group of designated international mobile subscriber identities, a determination that the communication device has not received a reassignment of one of a subset of the group of designated international mobile subscriber identities that have been reassigned from communication devices, and a determination that the communication device is not eligible for communication service, providing the communication device with provisioning information that disables use of the international mobile subscriber identity by the communication device.

20. The non-transitory machine-readable storage medium of claim 19, wherein the operations further comprise, providing provisioning information to reassign, to a second communication device, the international mobile subscriber identity from the group of the designated international mobile subscriber identities that is not included in the subset of the group of the designated international mobile subscriber identities.

* * * * *